United States Patent

[11] 3,588,909

[72] Inventor Robert W. Beckwith
1002 Greenfield Lane, Mount Prospect, Ill. 60056

[21] Appl. No. 835,545
[22] Filed June 23, 1969
[45] Patented June 28, 1971

[54] SPIKE SUPPRESSOR CIRCUIT FOR ANALOGUE RECORDER
8 Claims, 3 Drawing Figs.

[52] U.S. Cl. .......... 346/33, 346/146
[51] Int. Cl. .......... G01d 5/12
[50] Field of Search .......... 346/33, 32, 65, 146; 325/473, 477, 478

[56] References Cited

UNITED STATES PATENTS

| | | | |
|---|---|---|---|
| 2,673,559 | 3/1954 | Fawcett | 346/33X |
| 2,852,622 | 9/1958 | Fedde et al. | 325/478X |
| 3,332,021 | 7/1967 | Hedlund | 325/478X |
| 3,428,762 | 2/1969 | Geddes et al. | 178/6.6X |

*Primary Examiner*—Joseph W. Hartary
*Attorney*—Stone, Zummer, Livingston & Aubel

ABSTRACT: A circuit is disclosed which detects noise bursts, effectively cancels the input signal during the duration of noise burst, and couples the input signal received just prior to a noise burst to the associated output circuitry until the noise burst decreases below a threshold level to thus enable usable data to be obtained during such periods.

INVENTOR.
ROBERT W. BECKWITH

BY

Stone, Zummer, Livingston & Aubel
ATTORNEYS

CHART SHOWING
NORMAL RECORDING
FOLLOWED BY
SEVERE SPIKING

SAME DATA AS FIG. 2
BUT ON A RECORDER
OPERATED FROM THE
INVENTIVE CIRCUIT

INVENTOR.
ROBERT W. BECKWITH
BY
Stone, Zummer, Livingston & Aubel
ATTORNEYS

SPIKE SUPPRESSOR CIRCUIT FOR ANALOGUE RECORDER

Spikes on analog telemeter signal recordings of power flow may be caused on a receiving recorder by noise on the microwave, carrier current or wire facilities. The term "spike" is used to describe the wide excursion of a chart recorder during a noise burst with the input signal providing a true or correct reading before and after the spike.

In the case of microwave channels, noise generally occurs due to the condition of multipath reception of signals of very nearly equal amplitude and varying phase angles; and, the noise is largely the signal flowing in one path interfering with a signal flowing via another path, rather than from interference from outside sources. The distortion on any one multiplex channel will vary with phase angle between the received signals, and therefore with very small changes in path length. Characteristically, a channel will alternate rapidly from a badly distorted state to a useful state.

In the case of carrier current channels, noise is generally caused by lightning, breaker operations or switch disconnect operations. In such instances, noise is separate from the signal, but here again the characteristic is that periods of high noise burst are followed by periods of good signals.

In the case of wire facilities, noise bursts can also be caused by various factors, including occasional maintenance procedures, and again are intermittent in nature.

Accordingly, it was found that for general analog telemetering application, the noise bursts or spikes, even during extreme conditions, are interspersed with good data so as to permit obtaining a usable telemeter output. Thus, the nature or characteristic of all the above-noted noise conditions makes it possible to detect and ignore, or effectively eliminate, the noise bursts and obtain usable indications or readings from the data lying between the noise bursts.

The spike suppressor circuit of the invention functions to eliminate erroneous reading from analog telemeter channels during periods of spiking activity, and also during periods of channel failure. During such periods, the spike suppressor circuit feeds the previous input signal to the output circuit. Accordingly, usable data can continue to be obtained during such periods of spiking activity or channel failure.

Accordingly, it is a principal object of the present invention to provide a circuit for an analog data receiver which circuit detects and effectively cancels spikes or noise bursts on the incoming data signals and enables the utilization of the data lying between the noise burst.

It is another object of the invention to detect the rate of change of a signal reading either in a positive or negative direction and use this information as an indication of undesired spikes. When the spike is detected, the signal is suppressed; and, the signal reading being received just prior to the detection of the spike is fed to the output until after the spike has terminated to thereby provide usable output readings.

The foregoing and other objects, features, and advantages of the invention will be apparent from the following more particular description of a preferred embodiment of the invention, as illustrated in the accompanying drawings wherein.

DESCRIPTION OF PREFERRED EMBODIMENT

Figure 1:
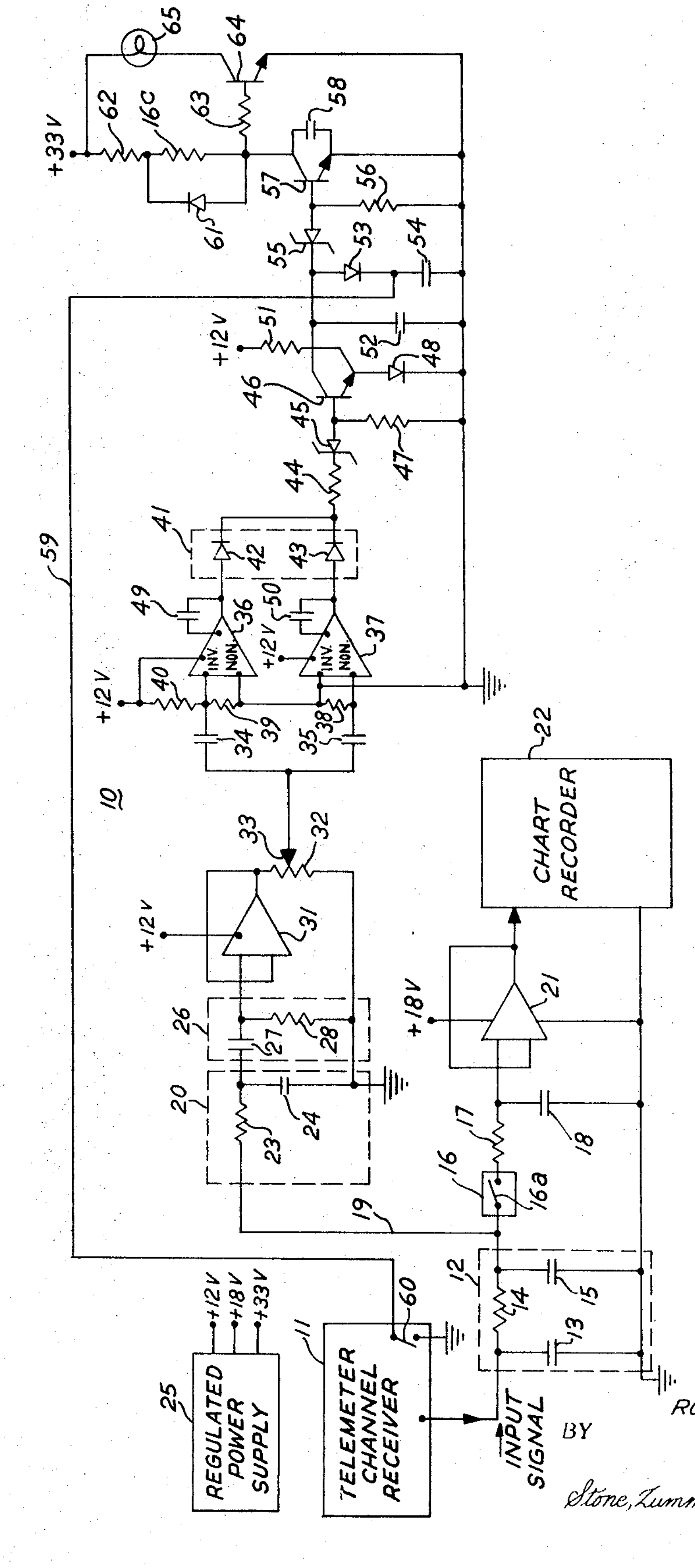
FIG. 1 is a schematic diagram of the spike suppressor circuit in accordance with the invention.

A preferred embodiment of the spike suppressor circuit 10 is shown in FIG. 1. As is customary, the circuit connections will first be described with reference to FIG. 1, then the circuit operation will be explained.

In FIG. 1, the input signal from a suitable associated telemeter receiver 11 is coupled to a conventional low pass R-C filter 12 consisting of capacitors 13 and 15 connected in parallel and a resistor 14 connected in series with the signal path. The output of the filter 12 is connected through movable contact 16*a* of high speed relay 16 of the mercury contact type and a series resistor 17 to a known type DC amplifier 21. A capacitor 18 is connected across the input, or in parallel with the input to amplifier 21. The output signal from amplifier 21 is connected to a suitable chart recorder 22.

A transformer power supply 25 operating from line current provides regulated voltages to the circuit as conventionally indicated.

A second path from filter 12 through lead 19 couples the signal to another filter 20 comprising a series connected resistor 23 and a parallel connected capacitor 24. The signal from filter 20 is coupled to a differentiating circuit 26 consisting of a series capacitor 27 and a parallel resistor 28. Capacitor 27 blocks out the DC component of the signal, and hence differentiating circuit 26 provides only the change components of the input signal to a suitable AC amplifier 31.

The output of amplifier 31 is taken from the variable tap 33 of a potentiometer 32. The signal on variable tap 33 is connected through a first signal path comprising a series capacitor 34 to the inverting input connection of an amplifier 36; and, simultaneously through a second signal path comprising a series capacitor 35 to the noninverting input connection of an amplifier 37. Biasing resistors 38 and 39 are connected across the inputs to amplifiers 36 and 37, and in addition, a resistor 40 is connected from the inverting input of amplifier 36 to the source of biasing voltage. Resistor 40 functions to balance the biasing current in amplifiers 36 and 37. More explicitly, resistor 40 is selected to cause the biasing current flowing through amplifier to be of a magnitude to balance the bias for amplifier 37. Amplifiers 36 and 37 are both biased to provide a low output signal when in a quiescent condition. When the voltage appearing at tap 33 of potentiometer 32 rises, amplifier 36 will switch to its high output state; and, in turn, when the voltage at tap 33 decreases, amplifier 37 will switch to its high output state.

The output signals from amplifiers 36 and 37 are respectively connected to the anodes of diodes 42 and 43. Signal stabilizing capacitors 49 and 50 are connected at the outputs of amplifiers 36 and 37, respectively. The cathodes of the diodes 42 and 43 are connected together and thence through series connected resistor 44 and Zener diode 45 to the base of NPN transistor amplifier 46.

Diodes 42 and 43 form an Or circuit 41 such that when either amplifier 36 or amplifier 37 switch to their high state, amplifier 46 will be turned on. Zener diode 45 functions to turn amplifier 46 ON and OFF more sharply. The biasing circuit for amplifier 46 includes a resistor 47 connected from its base to ground, a resistor 51 connected from its emitter to a positive potential and a diode 48 connected from its emitter to ground.

The output of amplifier 46 is coupled from its collector through a series connected Zener diode 55 to the base of a second NPN transistor amplifier 57. A first capacitor 52 is connected from the collector of amplifier 46 to ground. A second capacitor 54 has one plate connected to ground and its other plate connected to the cathode of a diode 53 which, in turn, has it anode connected to the collector of transistor 46. The junction of diode 53 and capacitor 54 is connected through lead 59 to the telemeter channel failure contact 60, of any suitable type, for purposes to be discussed.

The base of transistor 57 is connected through a resistor to ground, its emitter is connected to ground and its collector is connected through the energizing winding 16*c* of relay 16 and a resistor 62 to a positive potential. A diode 61 is connected across winding 16*c* to protect transistor 57 against voltage surges which may be developed across winding 16*c*. A transient bypass capacitor 58 is connected across the collector to emitter of transistor 57. The collector of transistor 57 and winding 16c is connected through a series resistor 63 to the base of a third NPN transistor amplifier 64. The emitter of amplifier 64 is connected to ground and its collector is connected through the filament of a lamp 65 to a source of positive potential. As will be explained in more detail hereinafter, transistor 57 is normally ON and transistor 64 is normally OFF. With transistor 57 ON current will be flowing through relay winding 16c to maintain the relay 16 energized and relay contact 16a closed to couple the input signal to the chart recorder 22. When transistor 57 is turned OFF, the current through winding 16c will be interrupted causing relay contact 16a to open; concurrently, transistor 64 will be turned ON enabling current to flow through the filament of lamp 65 to light the lamp 65 thereby indicating a period of spike activity or channel failure. In one embodiment, the following components were employed:

DC amplifier 21 Fairchild MA741C
AC amplifiers 31;36;37 General Electric PA230
NPN transistors 46;57;64 General Electric D16P4
Chart Recorder 22 L & N Speedomax H

OPERATION

The overall operation of the circuit will now be explained.

In one operating arrangement a reading was being processed of a 345KV interchange power between two electric utilities. The reading was represented by an 18—30 c.p.s. signal transmitted by microwave channels using FSK (frequency shift keying) modulation of audio-tone subcarriers. The output of the 18—30 c.p.s. frequency demodulator contained a high amplitude of 18—30 c.p.s. frequency superimposed on a DC component representing the reading. Portions of the AC components exceed the rate of change threshold and hence it was necessary to eliminate these components. Accordingly, the input signal was coupled to an R-C filter 12 which removes those portions of the AC components of the telemeter signal which exceed the rate of change threshold.

The signal is next coupled from filter 12 through movable contact 16a of relay 16 to amplifier 21. Amplifier 21 amplifies the input signal with minimum distortion and yet presents an extremely high impedance to the input source. Note that capacitor 18 is connected at the input of amplifier 21. Thus, when the movable contact 16a is opened as briefly explained above, capacitor 18 functions as a memory to hold the signal reading for relatively long periods of time. In the embodiment described, memory capacitor 18 maintained its voltage with a drift towards center scale of about 10 percent per minute.

Figure 3:
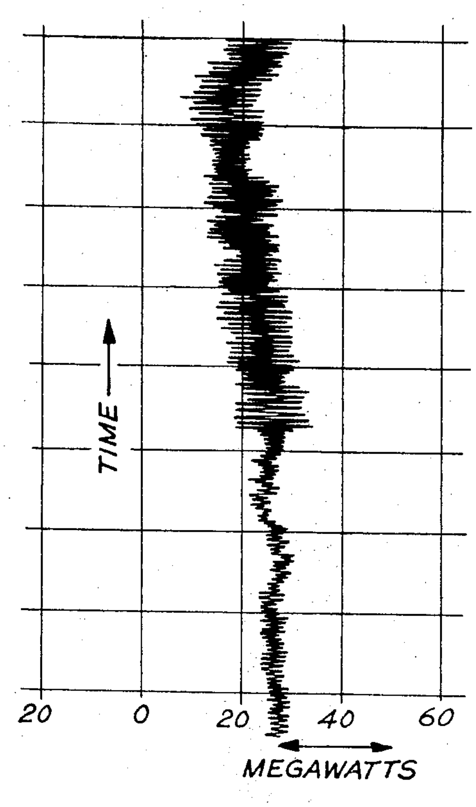
FIG. 3 is a chart showing the same data as in FIG. 2 being recorded on a recorder operated from the output of the inventive circuit.

The voltage output from capacitor 18 is amplified by amplifier 21 to drive the chart recorder 22 to provide a signal record without spikes as shown in FIG. 3.

The impedance values of resistor 17 and capacitor 18 are selected such that the readings on the chart recorder 22 will adjust in milliseconds to any new signal value upon reclosing of the relay contact 16a.

The signal passing through the filter 12 is also coupled through the filter 20 to the differentiating circuit 26. As noted above, the differentiating circuit 26 blocks out the DC components of the input signal, and hence only the varying or changing components of the input signal are coupled to amplifier 31.

The output from amplifier 31 is coupled from the variable tap 33 of potentiometer 32 to amplifiers 36 and 37, which are biased to provide low output in the quiescent condition of the circuit. Amplifiers 36 and 37 function as rate of change detectors with amplifier 37 arranged to detect negative-going signal excursions or slopes, and amplifier 36 arranged to detect positive-going signal excursions or slopes. More specifically, when the input to amplifier 36 rises, amplifier 36 will switch to a high output state.

Amplifiers 36 and 37 are arranged so that only a very small voltage change is required to switch their output state which thus results in a spike detector that will operate on the first few percent of the total spike excursion.

The outputs from amplifiers 36 and 37 are coupled to diodes 42 and 43 which together function as an Or circuit 41 such that when either of the amplifiers 36 or 37 switches to a high output state, Or circuit 41 will provide a signal to amplifier 46.

Amplifier 46 is biased to be OFF in its quiescent condition and will turn ON in response to a signal received from Or circuit 41 indicating that one or the other of amplifiers 36 or 37 has shifted to a high output state. When amplifier 46 turns ON it will provide a low signal to cause amplifier 57 to turn OFF. As mentioned above, when amplifier 57 is turned OFF, the current flow through the energizing winding 16c of relay 16 is interrupted causing the relay contact 16a to drop out or open.

Also, when amplifier 46 turns ON, capacitor 52 will be discharged through the low impedance path consisting of the collector to emitter path of amplifier 46 and diode 48 to ground. Capacitor 52 thus functions as a pulse stretcher, i.e., it maintains amplifier 57 OFF, and hence maintains the relay contact 16c open for a portion of a second after the signal change has occurred. This assures that the spike has terminated and permits the circuit to ride over the top of the spike when the spike slope quickly changes direction.

As mentioned above, when amplifier 57 turns OFF, a high signal is coupled to turn amplifier 64 ON. When amplifier 64 turns ON, a current is caused to flow through the lamp 65 thereby indicating visually the presence of noise. The indication by lamp 65 that noise is present can suggest to maintenance personnel that corrective procedures may be required.

The telemeter channel receiver includes a channel failure contact 60 which is connected through lead 59 to the junction of diode 53 and capacitor 54. When channel failure occurs, contact 60 closes thus discharging capacitor 54 through lead 59 and contact 60 to ground. Also, when contact 60 closes, capacitor 52 is discharged through a path which may be traced from the upper plate of capacitor 52, diode 53, lead 59, contact 60 to ground. Thus, when channel failure occurs both capacitors 52 and 54 will be discharged and transistor 57 will remain OFF. Relay 16 will be deenergized until transistor 57 turns ON or for approximately ten seconds after the channel failure contact 60 opens and the channel is restored. This time delay permits the reading to settle to a true value after restoration of the channel. The reading is maintained with little drift for as long as one minute and is sufficient time for an operator to switch to a manually set value without interrupting the control functions.

Figure 2:
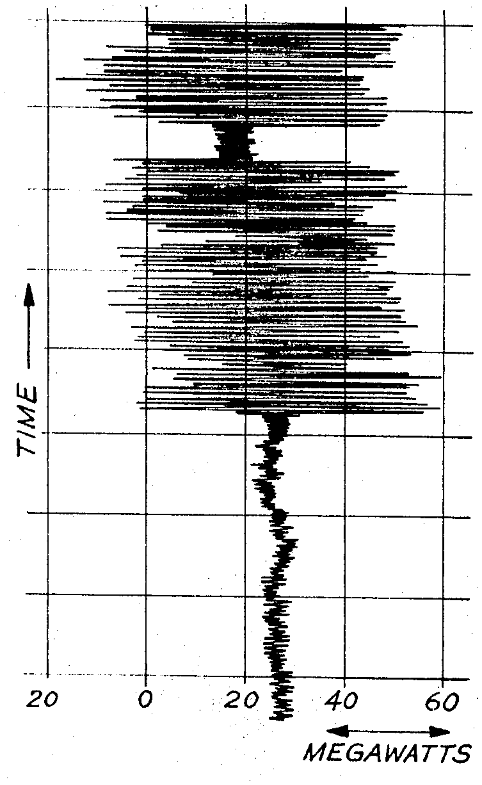
FIG. 2 is a chart showing a normal recording followed by severe spiking in a receiving channel not utilizing the invention.

Thus, the spike suppressor circuit of the invention holds the reading received just prior to each noise burst, eliminates the spike thus causing a relatively smooth and accurate chart recording in spite of noise burst. A portion of a chart which is a copy of an actual chart record obtained during the operation of the inventive circuit is shown in FIG. 3. This compares with the chart record of the same data as recorded with a recorder not utilizing the inventive circuit as shown in FIG. 2. The improvement and advantage of the circuit is clearly seen.

While the invention has been particularly shown and described with reference to a preferred embodiment thereof, it will be understood by those skilled in the art that various changes in form and details may be made therein without departing from the spirit and scope of the invention.

I claim:

1. A circuit for use in association with an analog signal recorder for suppressing spikes and obtaining usable data during the periods of spiking activity such as caused by noise bursts superimposed on the input signal comprising, in combination:

means for sensing signals changing at a rate faster than a selected threshold;

means for interrupting the input signal to said recorder in response to said fast changing signals;

means for decoupling said input signal to said recorder in response to said fast changing signals; and means for providing a signal to said recorder representative of the input signal being received prior to said fast changing signal whereby spikes or wide excursions of said recorder are eliminated.

2. A spike suppressor circuit for use with a recorder for an analog telemetering channel for suppressing spikes and enabling the utilization of data lying between noise bursts comprising, in combination:

means for coupling the input signals to said recorder;

means for detecting noise bursts superimposed on said signal;

means for disconnecting the input signal received during the duration of the noise burst from said recorder; and means for developing a signal representative of the input signal received prior to the noise burst and coupling said developed signal to said recorder during the duration of said noise burst whereby data lying between the noise bursts is utilized to provide continuous usable recordings.

3. A circuit as in claim 2 wherein said means for coupling the input signals to said recorder comprises a series connected relay contact and an amplifier having a high input impedance, and said means for developing a signal comprising a capacitor having one plate connected to the junction of said relay contact and said amplifier, and its other plate connected to reference potential whereby when said disconnecting means is actuated said capacitor provides a relatively steady potential to said amplifier to drive said recorder.

4. A circuit as in claim 2 wherein said means for detecting a noise burst comprises a differentiating circuit for differentiating the input signals thereby providing an output indicative of rate of change of said input signal; positive and negative slope detectors for providing outputs in response to fast excursions of the input signal in positive and negative directions respectively, and an Or circuit means for receiving the output of said detectors.

5. A circuit as in claim 2 wherein said means for disconnecting the input signals from said recorder comprise amplifier means, a relay including a movable contact and having its coil connected in series with said amplifier, whereby when said amplifier is in a conducting condition current flows through said relay coil and energizes the relay contacts to a closed position and when said amplifier is turned OFF the current through said coil is interrupted to open the movable contact of said relay.

6. A circuit as in claim 5 further including a capacitor connected in the input circuit of said amplifier means whereby when said amplifier is turned OFF said capacitor is discharged and maintains said amplifier turned OFF for a period of time after said noise burst is terminated.

7. A circuit as in claim 6 associated to function in response to actuation of a channel failure contact further including a diode and a capacitor connected in series with one another and in parallel with said first capacitor, said diode connecting said second capacitor to the input of said amplifier means connecting the junction of said diode and said second capacitor to said channel failure contact, whereby said contact is energized to indicate channel failure, and said first and second capacitors are discharged through said contact to maintain said amplifier OFF for a relatively long period of time enabling circuit corrective measures to be employed.

8. A circuit as in claim 5 including a second amplifier connected to receive a signal from said first amplifier and being in a nonconducting condition when said first amplifier is conducting and in a conducting condition when said first amplifier is nonconducting; a lamp connected in series with said current path of said second amplifier whereby when said first amplifier is turned OFF in response to a noise burst, said second amplifier is turned ON to permit the lamp to light and thereby to visually indicate said noise burst.